(12) United States Patent
Tabuchi et al.

(10) Patent No.: US 10,415,652 B2
(45) Date of Patent: Sep. 17, 2019

(54) CLUTCH APPARATUS OF TRANSMISSION FOR VEHICLE

(71) Applicant: TOYOTA JIDOSHA KABUSHIKI KAISHA, Toyota-shi (JP)

(72) Inventors: Motoki Tabuchi, Mishima (JP); Atsushi Honda, Seto (JP); Takaho Kawakami, Susono (JP); Junko Ichikawa, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 76 days.

(21) Appl. No.: 15/411,227

(22) Filed: Jan. 20, 2017

(65) Prior Publication Data
US 2017/0211633 A1    Jul. 27, 2017

(30) Foreign Application Priority Data

Jan. 26, 2016 (JP) ................. 2016-012177

(51) Int. Cl.
| F16D 13/62 | (2006.01) |
| F16D 13/68 | (2006.01) |
| F16D 25/0638 | (2006.01) |
| F16D 13/52 | (2006.01) |
| F16D 13/74 | (2006.01) |

(52) U.S. Cl.
CPC .......... *F16D 13/62* (2013.01); *F16D 13/683* (2013.01); *F16D 13/52* (2013.01); *F16D 13/74* (2013.01); *F16D 25/0638* (2013.01); *F16D 2300/12* (2013.01)

(58) Field of Classification Search
CPC ...................................... F16D 13/62
See application file for complete search history.

(56) References Cited

U.S. PATENT DOCUMENTS

| 5,127,503 A | * | 7/1992 | Gratzer | ................... F16D 35/00 192/58.42 |
| 5,485,905 A | * | 1/1996 | Rader, III | ............. B62M 11/00 192/41 A |

(Continued)

FOREIGN PATENT DOCUMENTS

| JP | 56-18426 U | 2/1981 |
| JP | 56-132499 A | 10/1981 |

(Continued)

*Primary Examiner* — Jacob S. Scott
*Assistant Examiner* — Ryan P Dodd
(74) *Attorney, Agent, or Firm* — Oblon, McClelland, Maier & Neustadt, L.L.P.

(57) ABSTRACT

A clutch apparatus includes a clutch drum and a band. The clutch drum includes spline large-diameter portions protruding outward in a radial direction of the clutch drum and spline small-diameter portions protruding inward in the radial direction. The spline large-diameter portions and the spline small-diameter portions are arranged alternately in a circumferential direction of the clutch drum. The band is wound around an outer peripheral portion of the clutch drum, and is made of carbon fiber reinforced plastic. The spline large-diameter portions are provided with a protrusion protruding outward in the radial direction. The band includes a recessed portion with which the protrusion is engaged. The recessed portion is provided at a position at which the recessed portion faces the protrusion.

3 Claims, 10 Drawing Sheets

(56) References Cited

U.S. PATENT DOCUMENTS

| | | | | | |
|---|---|---|---|---|---|
| 5,679,089 | A | * | 10/1997 | Levedahl | F16H 1/46 |
| | | | | | 475/330 |
| 5,896,970 | A | * | 4/1999 | Prater | F16D 13/52 |
| | | | | | 192/70.2 |
| 5,906,135 | A | * | 5/1999 | Prater | B23P 11/005 |
| | | | | | 29/521 |
| RE36,363 | E | * | 11/1999 | Tilton | F16D 13/71 |
| | | | | | 192/107 M |
| 6,035,986 | A | * | 3/2000 | Hofmann | F16D 13/52 |
| | | | | | 192/113.24 |
| 8,622,182 | B2 | * | 1/2014 | Iwase | B60K 6/26 |
| | | | | | 180/65.26 |
| 2004/0035668 | A1 | * | 2/2004 | Prater | F16D 13/62 |
| | | | | | 192/70.2 |

FOREIGN PATENT DOCUMENTS

| | | |
|---|---|---|
| JP | 7-145828 | 6/1995 |
| JP | 2005-341724 | 12/2005 |
| JP | 2007-285446 A | 11/2007 |
| JP | 2012-219976 | 11/2012 |

\* cited by examiner

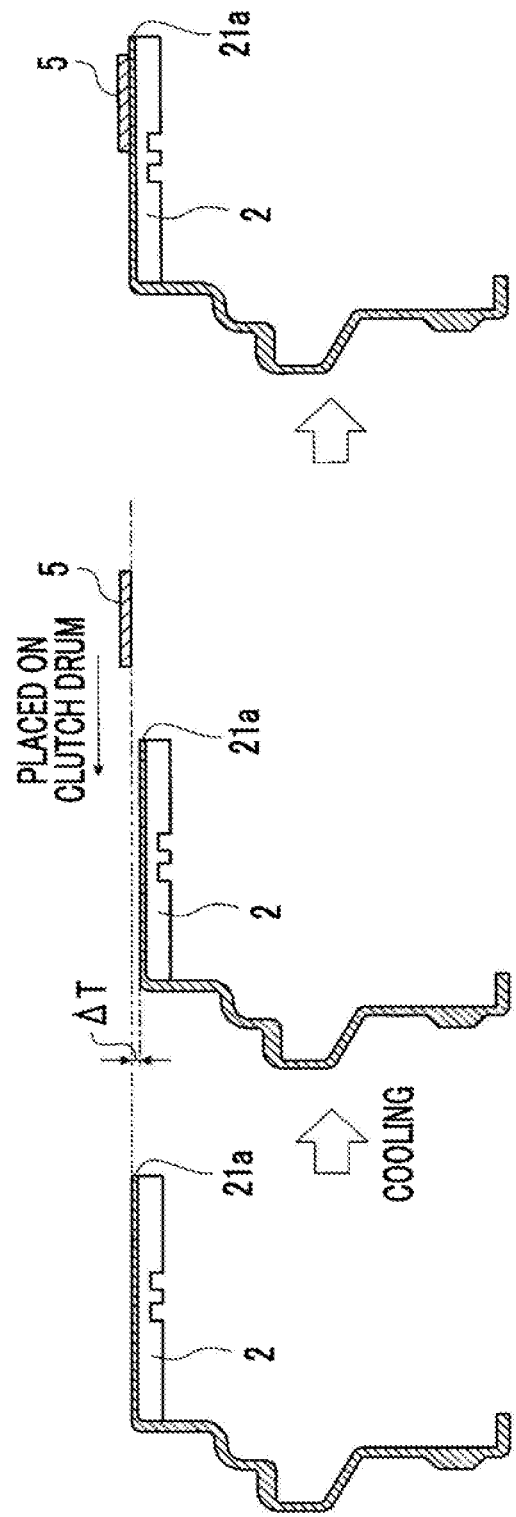

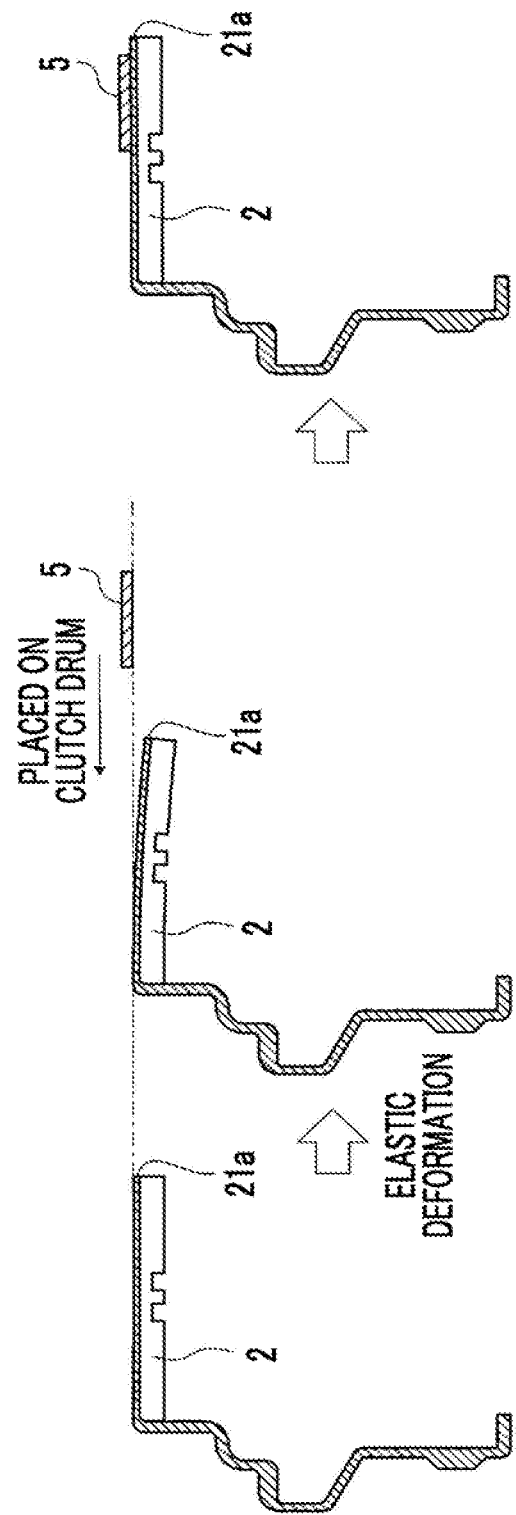

US 10,415,652 B2

CLUTCH APPARATUS OF TRANSMISSION FOR VEHICLE

INCORPORATION BY REFERENCE

The disclosure of Japanese Patent Application No. 2016-012177 filed on Jan. 26, 2016 including the specification, drawings and abstract is incorporated herein by reference in its entirety.

BACKGROUND

1. Technical Field

The disclosure relates to a clutch apparatus of a transmission for a vehicle.

2. Description of Related Art

A clutch drum provided in an automatic transmission for a vehicle attempts to expand radially outward due to a centrifugal force generated by the rotation of the clutch drum or due to a radially outward load generated by the transmission of torque. Japanese Patent Application Publication No. 2012-219976 (JP 2012-219976 A) describes a clutch drum provided with an annular band. The annular band is provided on an outer peripheral portion of the clutch drum in order to restrain the clutch drum from expanding radially outward.

A band may be made of a resin material in order to increase the rigidity of a clutch drum and to achieve weight reduction of the clutch drum. However, a clutch drum made of metal and a band made of resin are different in coefficient of thermal expansion from each other. For this reason, when a band is made of a resin material, a clearance may be formed between a clutch drum and the band in the radial direction due to temperature changes. As a result, the band is displaced with respect to the clutch drum, and thus the band may be detached from the clutch drum. To be specific, when a clutch drum made of metal shrinks but a band made of carbon fiber reinforced plastic (CFRP) does not shrink under a low-temperature environment, the band may be detached from the clutch drum as described above.

SUMMARY

The disclosure provides a clutch apparatus of a transmission for a vehicle, the clutch apparatus configured to restrain a band from being displaced with respect to a clutch drum.

An aspect of the disclosure relates to a clutch apparatus of a transmission for a vehicle. The clutch apparatus includes a clutch drum and a band. The clutch drum has a bottomed cylindrical shape. The clutch drum includes spline large-diameter portions and spline small-diameter portions that are arranged in a circumferential direction of the clutch drum. The spline large-diameter portions protrude outward in a radial direction of the clutch drum, and the spline small-diameter portions protrude inward in the radial direction of the clutch drum. The band has an annular shape. The band is wound around an outer peripheral portion of the clutch drum. The band is made of carbon fiber reinforced plastic. The spline large-diameter portions are provided with a protrusion protruding outward in the radial direction of the clutch drum. The band includes a recessed portion with which the protrusion is engaged. The recessed portion is provided at a position at which the recessed portion faces the protrusion.

In the clutch apparatus according to the above-described aspect, the band may be configured such that a main direction in which carbon fibers are oriented is parallel to the circumferential direction of the clutch drum.

In the clutch apparatus according to the above-described aspect, a plurality of sets of the protrusion and the recessed portion may be provided, and the sets of the protrusion and the recessed portion may be provided at different positions that are offset from each other in a width direction of the band. With this configuration, it is possible to reduce the possibility that the band will be cracked along the circumferential direction by a stress acting on the band due to a force applied from the clutch drum due to a centrifugal force generated by the rotation of the clutch drum.

In the clutch apparatus according to the above-described aspect, the spline large-diameter portions may be provided with an oil drain hole for draining oil from an inside of the clutch drum to an outside of the clutch drum, and the band may be positioned such that at least a part of the oil drain hole is kept open. With this configuration, the oil drain hole is not blocked by the band. This reduces the possibility that oil cannot be drained from the inside of the clutch drum to the outside thereof.

With the clutch apparatus of a transmission for a vehicle according to the disclosure, the band can be restrained from displacing with respect to the clutch drum because the protrusion of the spline large-diameter portion and the recessed portion of the band are engaged with each other.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a view illustrating an example of a method of assembling the CFRP ring to the clutch drum;

FIG. 7 is a view illustrating another example of a method of assembling the CFRP ring to the clutch drum;

DETAILED DESCRIPTION OF EMBODIMENTS

Hereinafter, the configuration of a clutch apparatus of an automatic transmission for a vehicle according to an embodiment and a method of assembling the clutch apparatus will be described with reference to the accompanying drawings. The clutch apparatus according to the embodiment may be used as a clutch apparatus of a transmission for a vehicle other than an automatic transmission for a vehicle.

Figure 1:
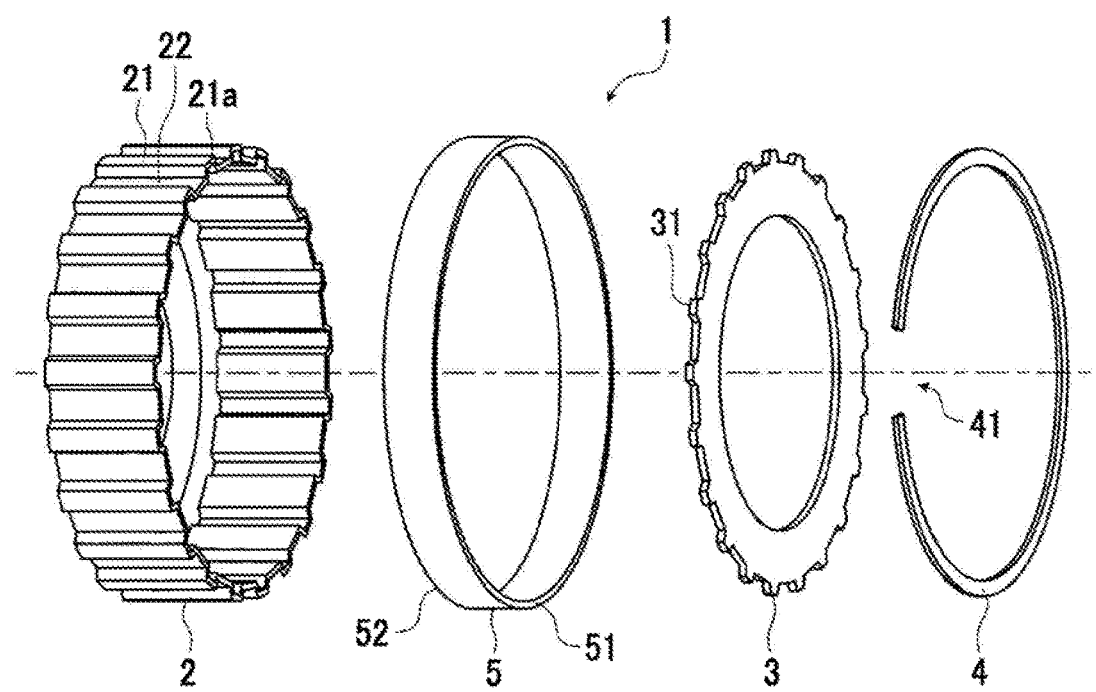
FIG. 1 is an exploded perspective view illustrating the overall configuration of a clutch apparatus of an automatic transmission for a vehicle according to an embodiment.

First, the overall configuration of a clutch apparatus of an automatic transmission for a vehicle according to an embodiment will be described with reference to FIG. 1. FIG. 1 is an exploded perspective view illustrating the overall configuration of the clutch apparatus according to the present embodiment.

As illustrated in FIG. 1, a clutch apparatus 1 according to the present embodiment includes a clutch drum 2, a clutch plate 3, a snap ring 4, and a carbon fiber reinforced plastic (CFRP) ring 5. The CFRP ring 5 is an example of a band.

The clutch drum 2 is a bottomed cylindrical member. Spline large-diameter portions 21 protruding radially outward and spline small-diameter portions 22 protruding radially inward are provided in an outer peripheral portion of the clutch drum 2. The spline large-diameter portions 21 and the spline small-diameter portions 22 are arranged alternately in the circumferential direction of the clutch drum 2.

The clutch plate 3 is an annular member. Spline large-diameter portions 31 protruding radially outward are provided on an outer peripheral portion of the clutch plate 3. The clutch plate 3 is inserted into the clutch drum 2 from an open end 21a of the clutch drum 2, and the spline large-diameter portions 31 are engaged with the spline large-diameter portions 21 of the clutch drum 2. Thus, the clutch plate 3 is spline-fitted to an inner peripheral surface 2a of the clutch drum 2.

The snap ring 4 is a generally annular member. The snap ring 4 has a split portion 41, that is, a clearance formed in a part of the generally annular member. The split portion 41 of the snap ring 4 is contracted, whereby the snap ring 4 is fitted to the inner peripheral surface 2a of the clutch drum 2 to which the clutch plate 3 has been spline-fitted. The snap ring 4 serves as a stopper for the clutch plate 3. That is, the snap ring 4 restrains the clutch plate 3 from moving in the axial direction, thereby restraining the clutch plate 3 from coming out of the open end 21a of the clutch drum 2.

The CFRP ring 5 is made of an annular carbon fiber reinforced plastic material. In the present embodiment, the CFRP ring 5 is made of a carbon fiber reinforced plastic material. However, the CFRP ring 5 may be made of a resin material other than carbon fiber reinforced plastic. The CFRP ring 5 is fitted onto the outer peripheral portion of the clutch drum 2, and is provided in the vicinity of a position at which the snap ring 4 is provided. The CFRP ring 5 restrains the clutch drum 2 from expanding radially outward.

Figure 2A:
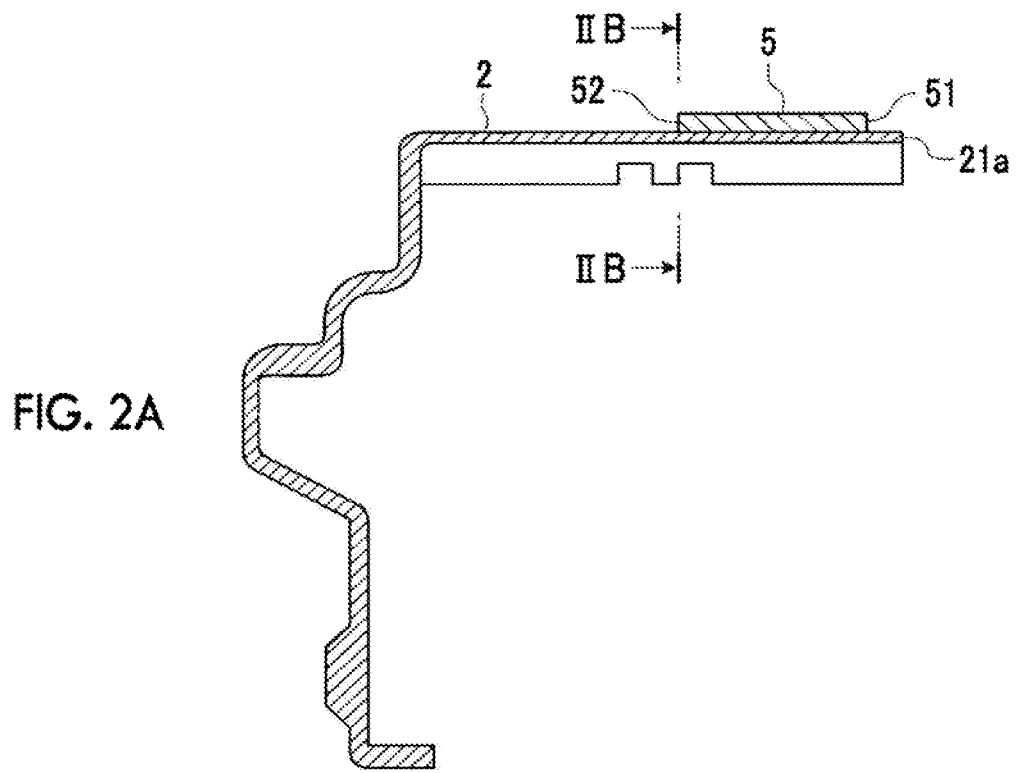
FIG. 2A is a partial sectional view illustrating the configurations of a clutch drum and a carbon fiber reinforced plastic (CFRP) ring illustrated in FIG. 1.
Figure 2B:
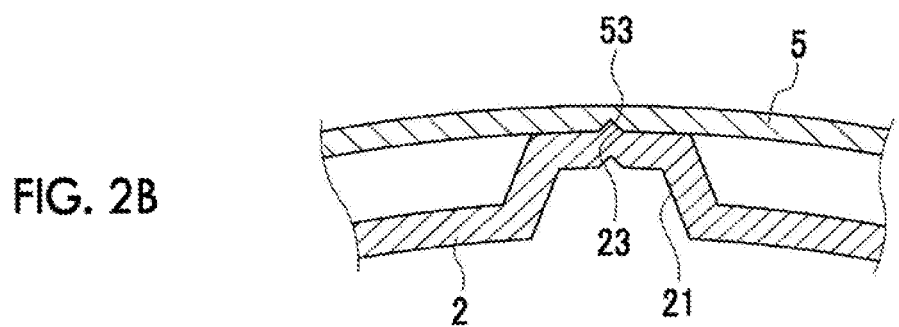
FIG. 2B is a sectional view illustrating the clutch drum and the CFRP ring when they are cut along a cutting plane taken along line IIB-IIB in FIG. 2A.
Figure 3A:
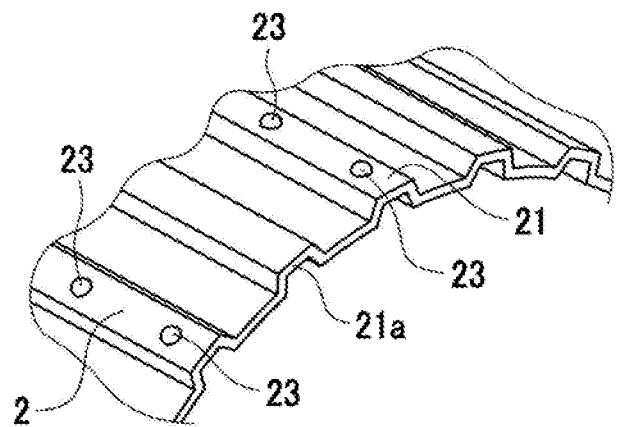
FIG. 3A is a view illustrating an example of positions at which protrusions are provided.
Figure 3B:
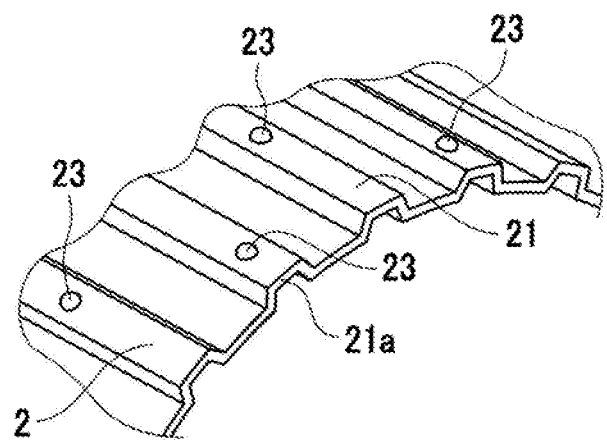
FIG. 3B is a view illustrating another example of positions at which protrusions are provided.
Figure 4A:
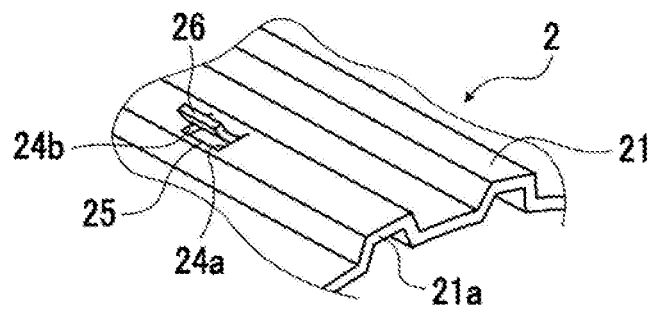
FIG. 4A is a view illustrating an example of a shape of a protrusion.
Figure 4B:
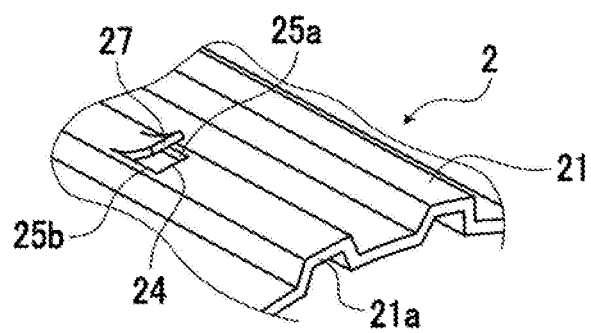
FIG. 4B is a view illustrating another example of a shape of a protrusion.
Figure 4C:
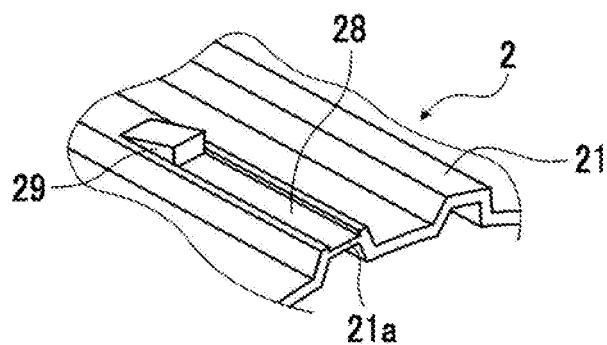
FIG. 4C is a view illustrating still another example of a shape of a protrusion.

Next, the configurations of the clutch drum 2 and the CFRP ring 5 will be described with reference to FIG. 2A to FIG. 5. FIG. 2A is a partial sectional view illustrating the clutch drum 2 and the CFRP ring 5 taken along the rotational axis direction. FIG. 2B is a sectional view illustrating the clutch drum 2 and the CFRP ring 5 when they are cut along a cutting plane taken along line IIB-IIB in FIG. 2A. FIG. 3A and FIG. 3B are views each illustrating an example of positions at which protrusions 23 are provided. FIG. 4A, FIG. 4B, and FIG. 4C are views each illustrating an example of a shape of a protrusion. In FIG. 2A and FIG. 2B, illustration of the clutch plate 3 and the snap ring 4 is omitted.

As illustrated in FIG. 2B, in the clutch apparatus 1 according to the present embodiment, spline large-diameter portions 21 of the clutch drum 2 are provided with the protrusions 23 protruding radially outward, and CFRP ring 5 has recessed portions 53 with which the protrusions 23 are engaged. Each recessed portion 53 is provided at a position at which the recessed portion 53 faces a corresponding one of the protrusions 23. The height of each protrusion 23 and the depth of each recessed portion 53 are each set to be equal to or greater than a clearance between the clutch drum 2 and the CFRP ring 5 in the radial direction, which may be formed under a conceivable temperature environment or operating environment. With this configuration, even when a clearance is formed between the clutch drum 2 and the CFRP ring 5 in the radial direction, the CFRP ring 5 is restrained from being displaced with respect to the clutch drum 2 because the protrusions 23 are engaged with the recessed portions 53.

The main direction in which carbon fibers constituting the CFRP ring 5 are oriented is preferably parallel to the circumferential direction of the clutch drum 2. Thus, the strength of the CFRP ring 5 in the circumferential direction of the clutch drum 2 is increased. As a result, it is possible to increase the durability to withstand a circumferential stress acting on the recessed portions 53 of the CFRP ring 5 due to the rotation of the clutch drum 2.

In a case where the main direction in which carbon fibers constituting the CFRP ring 5 are oriented is parallel to the circumferential direction of the clutch drum 2, when a force is applied from the clutch drum 2 to the CFRP ring 5 and thus a stress acts on the recessed portions 53 of the CFRP ring 5, the CFRP ring 5 may be cracked along the circumferential direction. For this reason, preferably, a plurality of sets of the protrusion 23 and the recessed portion 53 is provided, and the sets of the protrusion 23 and the recessed portion 53 are provided at different positions that are offset from each other in the width direction of the CFRP ring 5. Thus, the stress acting on the recessed portions 53 in the rotational axis direction is dispersed. As a result, the CFRP ring 5 is restrained from being cracked along the circumferential direction.

A set of the protrusion 23 and the recessed portion 53 at an end 51-side of the CFRP ring 5 in its width direction (hereinafter, referred to as "open end-side protrusion-recess section") and a set of the protrusion 23 and the recessed portion 53 at an end 52-side of the CFRP ring 5 in its width direction (hereinafter, referred to as "closed end-side protrusion-recess section") may be provided at the same spline large-diameter portion 21, as illustrated in FIG. 3A. Alternatively, the open end-side protrusion-recess sections and the closed end-side protrusion-recess sections may be provided in a staggered arrangement in the circumferential direction, as illustrated in FIG. 3B. When the open end-side protrusion-recess sections and the closed end-side protrusion-recess sections are provided in a staggered arrangement in the circumferential direction, a stress acting on the CFRP ring 5 due to a force applied from the clutch drum 2 is dispersed in the circumferential direction more efficiently and thus the CFRP ring 5 is more reliably restrained from being cracked along the circumferential direction, than when the open end-side protrusion-recess section and the closed end-side protrusion-recess section are provided at the same spline large-diameter portion 21.

Each protrusion 23 and each recessed portion 53 may have any shapes as long as they can be engaged with each other. For example, each protrusion 23 at the closed end-side may be formed as illustrated in FIG. 4A. That is, at a position at which the closed end-side protrusion-recess section is to be provided, cuts 24a, 24b extending in the circumferential direction are made at two respective portions of the spline large-diameter portion 21 of the clutch drum 2, which are apart from each other in the axial direction. Further, a cut 25 is made. The cut 25 extends in the axial direction so as to connect together the ends of the cuts 24a, 24b, which are at the same position in the circumferential direction. A cut-and-raised piece 26 made by deforming a portion, defined by the cuts 24a, 24b, 25, radially outward may be used as the protrusion 23. In this case, the protrusion 23 illustrated in FIG. 2B is provided at the open end 21a-side of the clutch drum 2.

Alternatively, for example, each protrusion 23 at the closed end-side may be formed as illustrated in FIG. 4B. That is, at a position at which the closed end-side protrusion-recess section is to be provided, cuts 25a, 25b extending in the axial direction are made at two respective portions of the spline large-diameter portion 21 of the clutch drum 2, which are apart from each other in the circumferential direction. Further, a cut 24 is made. The cut 24 extends in the circumferential direction so as to connect together the ends of the cuts 25a, 25b, which are at the same position in the axial direction. A cut-and-raised piece 27 made by deforming a portion, defined by the cuts 25a, 25b, 24, radially outward may be used as the protrusion 23. In this case, the protrusion 23 illustrated in FIG. 2B is provided at the open end 21a-side of the clutch drum 2.

Alternatively, for example, each protrusion 23 at the closed end-side may be formed as illustrated in FIG. 4C. That is, at a position at which the closed end-side protrusion-recess section is to be provided, a groove 28 extending in the axial direction from the open end 21a-side of the spline large-diameter portion 21 of the clutch drum 2 is provided, a wedge member 29 is provided in the groove 28. The wedge member 29 may be used as the protrusion 23. In this case, a wedge member 29 having the same shape as the wedge member 29 described above is provided at the open end 21a-side of the clutch drum 2.

Figure 5:
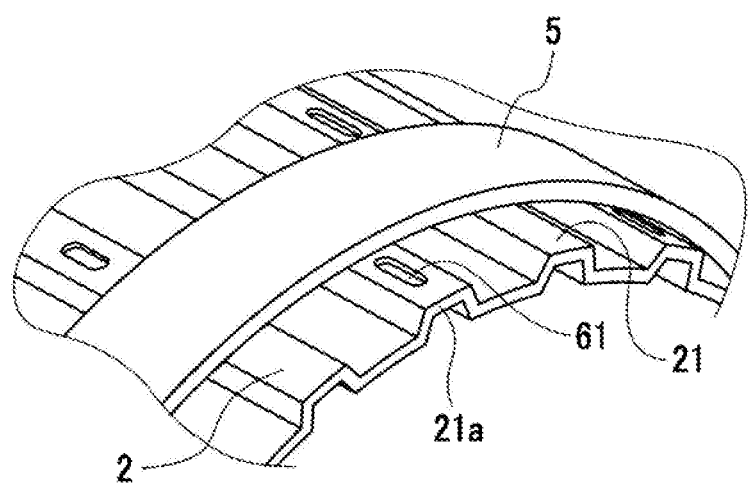
FIG. 5 is a view illustrating an example of a configuration of an oil drain hole.

As illustrated in FIG. 5, when the spline large-diameter portion 21 of the clutch drum 2 has an oil drain hole 61 for draining oil from the inside of the clutch drum 2 to the outside thereof, the CFRP ring 5 is preferably positioned such that at least a part of the oil drain hole 61 is kept open. With this configuration, the oil drain hole 61 is not blocked by the CFRP ring 5. This reduces the possibility that the oil cannot be drained from the inside of the clutch drum 2 to the outside thereof and thus negative effects, such as an increase in the dragging loss, will be caused.

Finally, a method of assembling the CFRP ring 5 to the clutch drum 2 will be described with reference to FIG. 6 to FIG. 10C. FIG. 6 is a view illustrating an example of a method of assembling the CFRP ring 5 to the clutch drum 2. FIG. 7 is a view illustrating another example of a method of assembling the CFRP ring 5 to the clutch drum 2. FIG. 8A to FIG. 10C are views illustrating a method of forming a protrusion and a recessed portion.

As illustrated in FIG. 6, in order to assemble the CFRP ring 5 to the clutch drum 2, the clutch drum 2 is cooled. When the temperature of the clutch drum 2 is reduced due to the cooling, the outer diameter of the clutch drum 2 made of metal is reduced by a length $\Delta T$, whereas the CFRP ring 5 made of resin does not shrink. For this reason, the outer diameter of the clutch drum 2 becomes smaller than the inner diameter of the CFRP ring 5. Thus, the CFRP ring 5 can be placed on the clutch drum 2 from the open end 21a of the clutch drum 2, whereby the CFRP ring 5 can be assembled to the clutch drum 2. The cooling temperature is set to a temperature at which the amount of shrinkage at least at the protrusion 23 is greater than the height of the protrusion 23.

As illustrated in FIG. 7, in order to assemble the CFRP ring 5 to the clutch drum 2, the open end 21a-side of the clutch drum 2 may be elastically deformed to make the outer diameter of the clutch drum 2 smaller than the inner diameter of the CFRP ring 5. Thus, the CFRP ring 5 can be placed on the clutch drum 2 from the open end 21a of the clutch drum 2, whereby the CFRP ring 5 can be assembled to the clutch drum 2. The amount of elastic deformation is set such that the amount of deformation at least at the protrusion 23 is greater than the height of the protrusion 23.

Figure 8A:
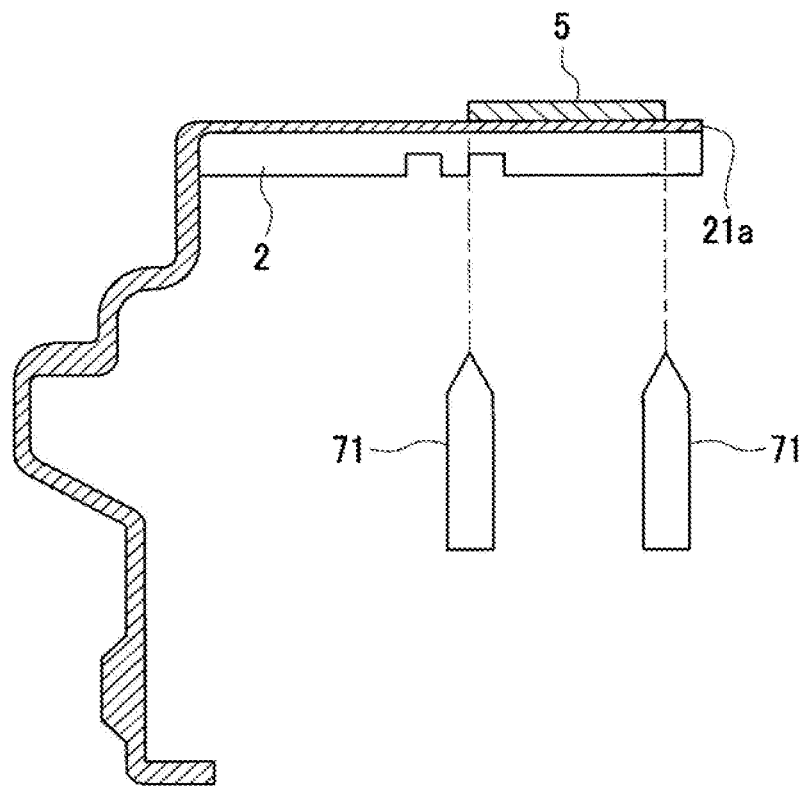
FIG. 8A is a view illustrating a method of forming a protrusion and a recessed portion.
Figure 8B:
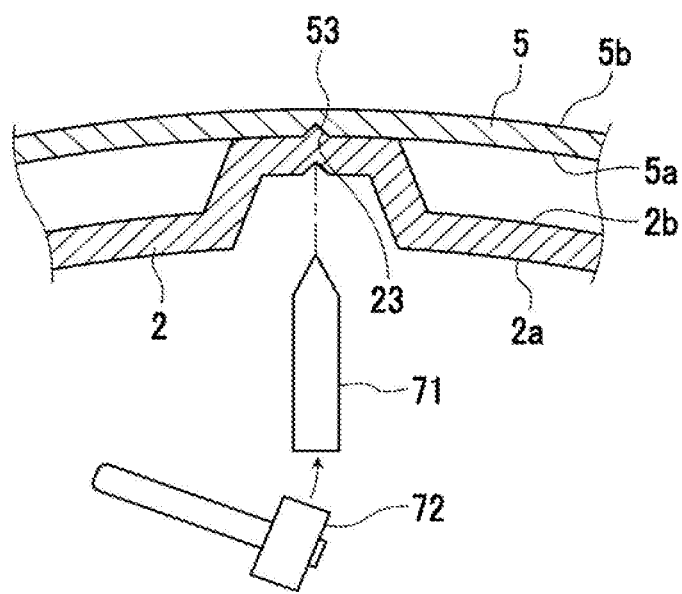
FIG. 8B is a view illustrating the method of forming the protrusion and the recessed portion.

As illustrated in FIG. 8A and FIG. 8B, the protrusions 23 and the recessed portions 53 may be formed in the following manner. After the CFRP ring 5 is assembled to the clutch drum 2, a pointed tip of a tool 71 is brought into contact with an inner peripheral surface 2a of the clutch drum 2, at a position at which the protrusion 23 and the recessed portion 53 are to be formed, and then a rear end of the tool 71 is hit with a hammer 72. When the protrusion 23 and the recessed portion 53 are formed in this way, a recessed portion is formed in the inner peripheral surface 2a of the clutch drum 2. However, as long as no protrusion is formed on the inner peripheral surface 2a of the clutch drum 2, the protrusion 23 and the recessed portion 53 may be formed in any method.

Figure 9A:
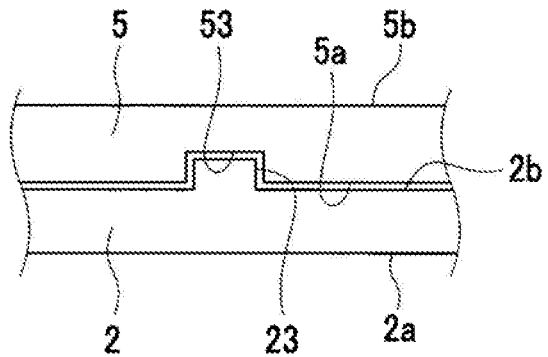
FIG. 9A is a view illustrating another method of forming a protrusion and a recessed portion.
Figure 9B:
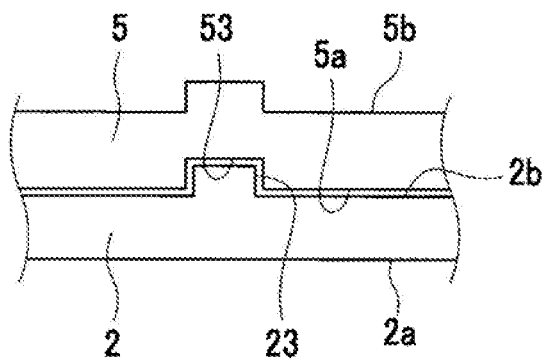
FIG. 9B is a view illustrating another method of forming a protrusion and a recessed portion.
Figure 9C:
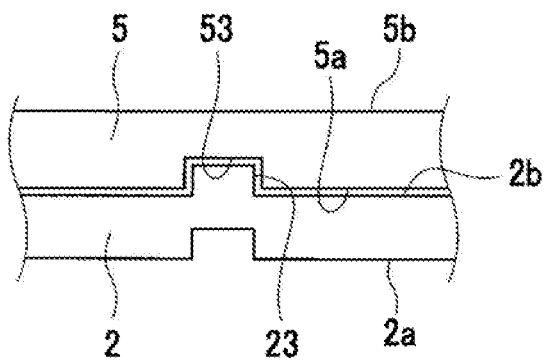
FIG. 9C is a view illustrating another method of forming a protrusion and a recessed portion.

For example, as illustrated in FIG. 9A, a protrusion 23 may be formed on an outer peripheral surface 2b of the clutch drum 2 through a molding process, and a recessed portion 53 may be formed in an inner peripheral surface 5a of the CFRP ring 5 through a molding process. Alternatively, for example, as illustrated in FIG. 9B, a protrusion 23 may be formed on the outer peripheral surface 2b of the clutch drum 2 through a molding process, and a recessed portion 53 may be formed in the inner peripheral surface 5a of the CFRP ring 5 with the tool 71. Alternatively, for example, as illustrated in FIG. 9C, a protrusion 23 may be formed on the outer peripheral surface 2b of the clutch drum 2 with the tool 71, and a recessed portion 53 may be formed in the inner peripheral surface 5a of the CFRP ring 5 through a molding process.

No protrusion is formed on the inner peripheral surface 2a of the clutch drum 2. This reduces the possibility that the clutch plate 3 will be caught on a protrusion on the inner peripheral surface 2a in the course of inserting the clutch plate 3 into the clutch drum 2 and thus the clutch plate 3 cannot be inserted into the clutch drum 2.

Figure 10A:
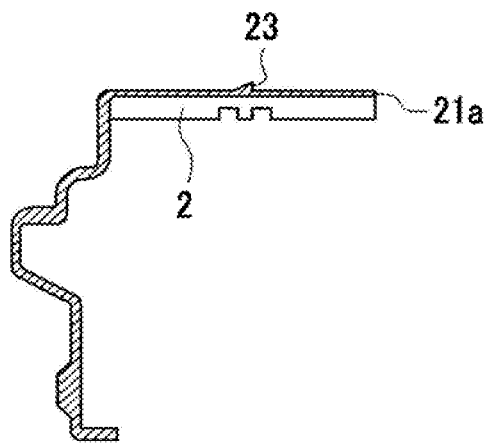
FIG. 10A is a view illustrating a method of forming a protrusion and a recessed portion.
Figure 10B:
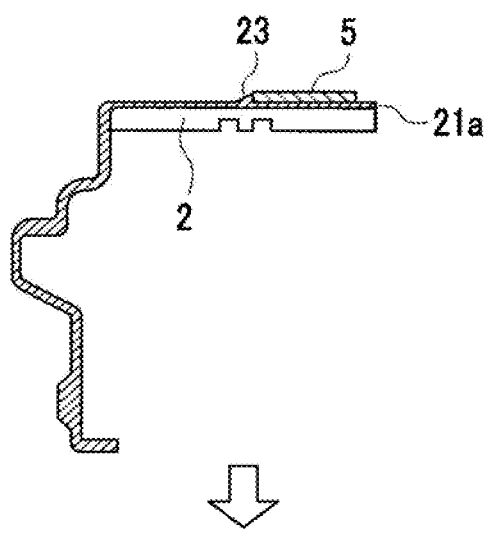
FIG. 10B is a view illustrating the method of forming the protrusion and the recessed portion.
Figure 10C:
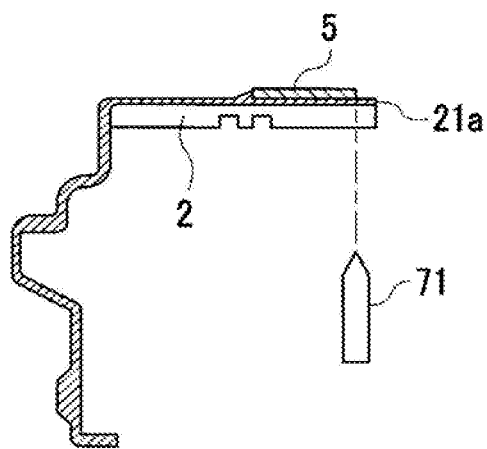
FIG. 10C is a view illustrating the method of forming the protrusion and the recessed portion.

When each protrusion 23 at the closed end-side has a shape as illustrated in FIG. 4A or FIG. 4B, the protrusion 23 and the recessed portion 53 at the open end 21a-side of the clutch drum 2 may be formed in the following manner. As illustrated in FIG. 10C, the tip of the tool 71 is brought to a position of the open end 21a of the clutch drum 2, at which the protrusion 23 is to be formed, and the rear end of the tool 71 is hit with the hammer 72.

While the example embodiments made by the inventors have been described above, the disclosure should not be limited by the description and drawings that constitute a part of the disclosure based on the foregoing embodiments. That is, various other embodiments, examples, and technologies implemented by those skilled in the art on the basis of the foregoing embodiments fall within the scope of the disclosure.

What is claimed is:

1. A clutch apparatus of a transmission for a vehicle, the clutch apparatus comprising:
 a clutch drum made of metal and having a bottomed cylindrical shape, the clutch drum including spline large-diameter portions and spline small-diameter portions arranged in a circumferential direction of the clutch drum, the spline large-diameter portions protruding outward in a radial direction of the clutch drum, and the spline small-diameter portions protruding inward in the radial direction of the clutch drum; and
 a band having an annular shape, the band being wound around an outer peripheral portion of the clutch drum, and the band being made of carbon fiber reinforced plastic, wherein
 the spline large-diameter portions are provided with a protrusion protruding outward in the radial direction of the clutch drum,
 the spline large-diameter portions include a first cut in a first direction, a second cut in the first direction, and a third cut in a second direction perpendicular to the first direction that connects the first cut and the second cut, the protrusion is defined by the first cut, the second cut, the third cut as a deformed portion raised radially outward,
 the band includes a recessed portion with which the protrusion is engaged, the recessed portion being provided at a position at which the recessed portion faces the protrusion, and
 a height of the protrusion and a depth of the recessed portion are respectively set to be greater than a clearance between the clutch drum and the band formed due to a difference of coefficients of thermal expansion of the clutch drum and the band in an operating environment of the vehicle.

2. The clutch apparatus according to claim 1, wherein:
 the protrusion is a first protrusion and the recessed portion is a first recessed portion;
 the spline large-diameter portions include a second protrusion and the band includes a second recessed portion; and
 a first axial end of the band contacts the first protrusion and a second axial end of the band contacts the second protrusion to arrange the band between the first protrusion and the second protrusion.

3. The clutch apparatus according to claim 1, wherein:
 the coefficient of thermal expansion of the clutch drum is less than the coefficient of thermal expansion of the band.

* * * * *